United States Patent [19]
Maroschak

[11] 3,891,733
[45] June 24, 1975

[54] METHOD OF MAKING CORRUGATED PLASTIC PIPE WITH INTEGRAL COUPLER COLLARS

[76] Inventor: Ernest J. Maroschak, Box 878, Roseboro, N.C. 28382

[22] Filed: July 13, 1972

[21] Appl. No.: 271,225

[52] U.S. Cl. .................. 264/40; 264/99; 264/150; 264/151
[51] Int. Cl.² .................. B29C 5/06; B29D 23/03; B29D 23/04
[58] Field of Search .......... 425/142, 302, 320, 321, 425/292, 342, 369–371, 291, 392, 396, 389, 29, 421; 264/89, 93, 94, 99, 150, 151, 159, 209, 250, 286, 287, 154–156, 176, 176 R, 210, 318, 334, 40; 83/54, 318; 226/108; 285/423, 235, 290, 376, 401, 402

[56] References Cited
UNITED STATES PATENTS

| | | | |
|---|---|---|---|
| 2,779,976 | 2/1957 | Roberts et al. | 156/144 X |
| 3,072,968 | 1/1963 | Watson et al. | 264/176 R |
| 3,264,383 | 8/1966 | Niessner et al. | 264/209 |
| 3,286,305 | 11/1966 | Seckel | 425/326 |
| 3,310,620 | 3/1967 | Martinelli et al. | 254/151 X |
| 3,371,770 | 3/1968 | Graham et al. | 226/108 UX |
| 3,399,262 | 8/1968 | Quackenbush | 264/210 X |
| 3,422,648 | 1/1969 | Lemelson | 29/33 D |
| 3,430,292 | 3/1969 | Bauman et al. | 425/183 |
| 3,620,115 | 11/1971 | Zieg et al. | 83/54 |
| 3,655,856 | 4/1972 | Spivy | 264/151 |
| 3,695,643 | 10/1972 | Schmunk | 285/423 |
| 3,751,541 | 8/1973 | Hegler | 264/150 |

FOREIGN PATENTS OR APPLICATIONS 1,193,939  6/1970  United Kingdom............... 264/209

*Primary Examiner*—Robert F. White
*Assistant Examiner*—Willard E. Hoag
*Attorney, Agent, or Firm*—Parrott, Bell, Seltzer, Park & Gibson

[57] ABSTRACT

A method and apparatus for continuously making corrugated plastic pipes having enlarged coupler collars on one end thereof by continuously extruding a tube of plastic material into a molding zone especially constructed to mold the tube into a series of successive closely spaced body-forming lengths of annularly corrugated pipe with short integral relatively enlarged sleeves interconnecting adjacent body-forming lengths. The thus molded tube is severed along a line about halfway between opposite ends of each successive sleeve to form each sleeve into a pair of separate coupler collars, and preferably the molded tube also is severed along a line about halfway between opposite ends of each corrugated body-forming length thereof. Preferably, the molding zone is constructed so as to form a plurality of latch members integral with and extending interiorly from each coupler collar, which latch members are adapted to engage the ribs on the opposite end of another like pipe for releasable connection therewith.

20 Claims, 14 Drawing Figures

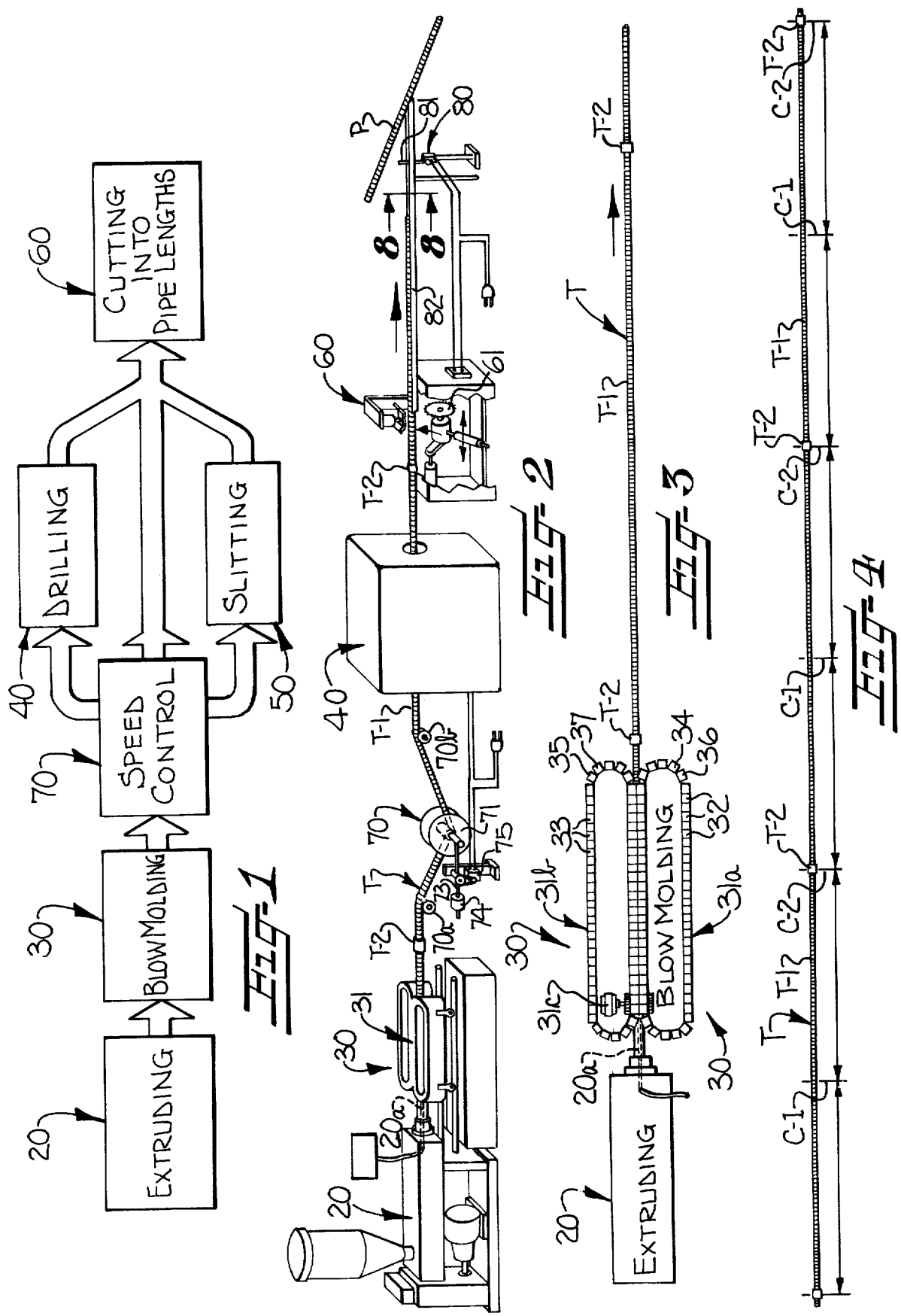

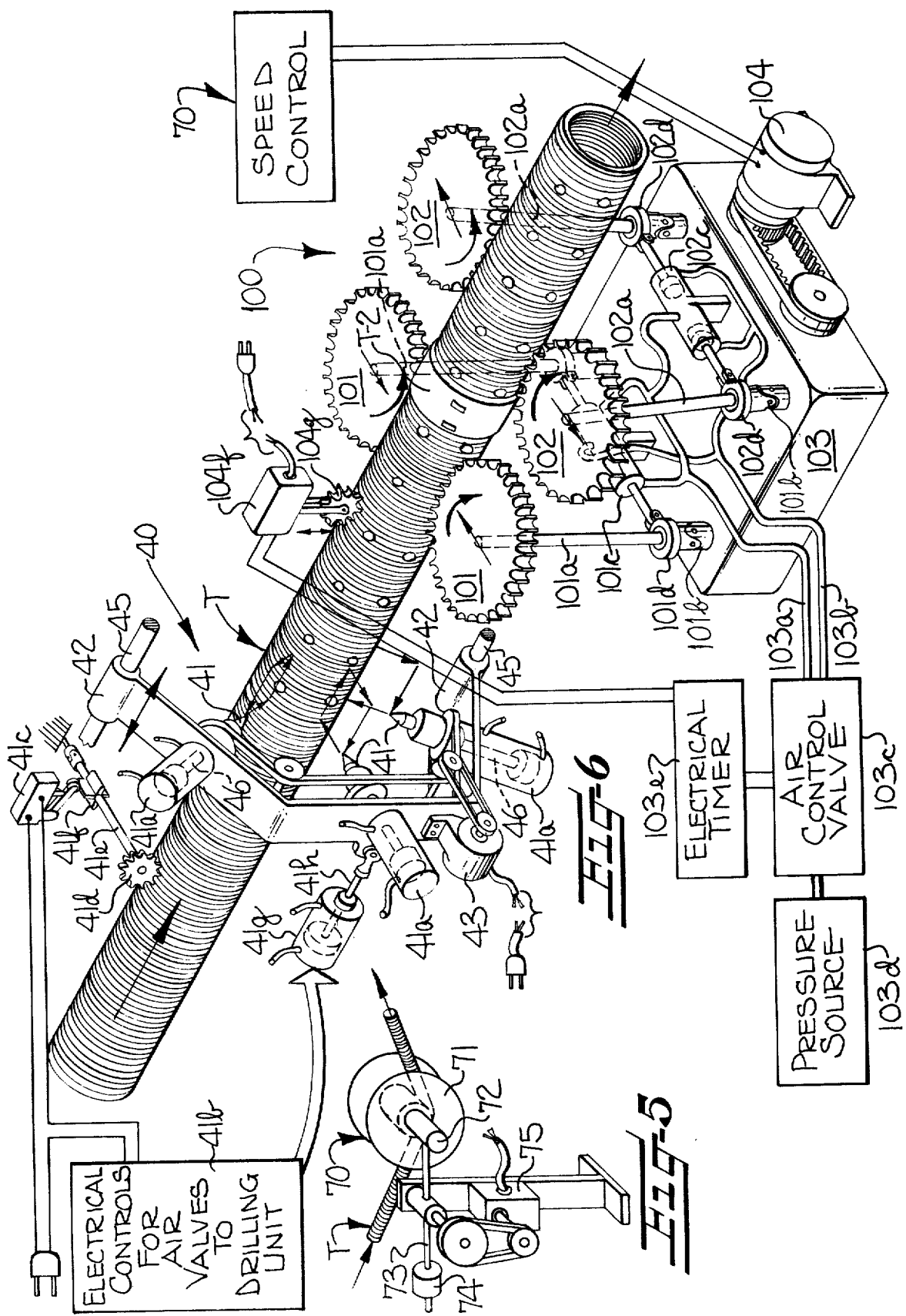

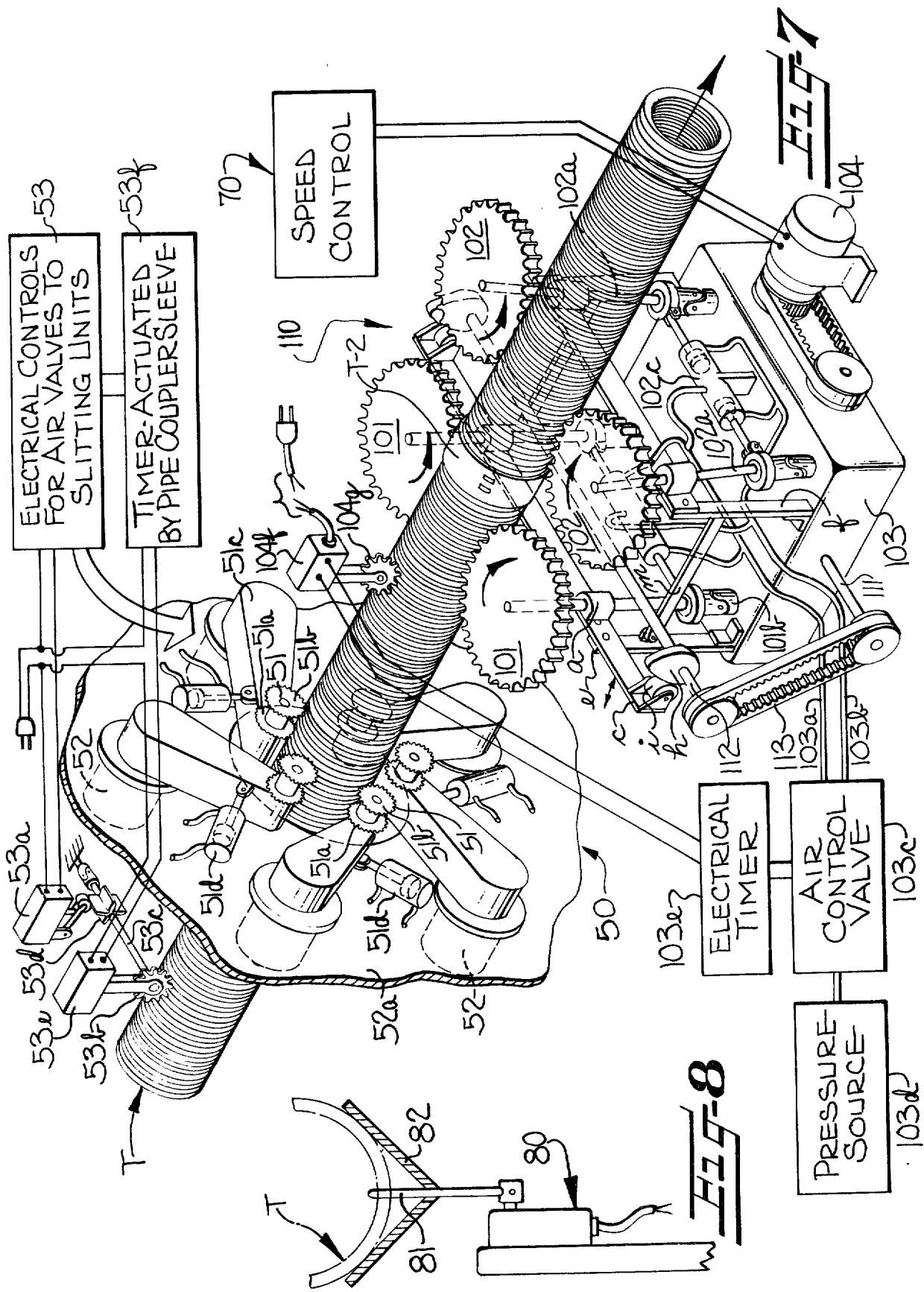

PATENTED JUN 24 1975 3,891,733

SHEET 4

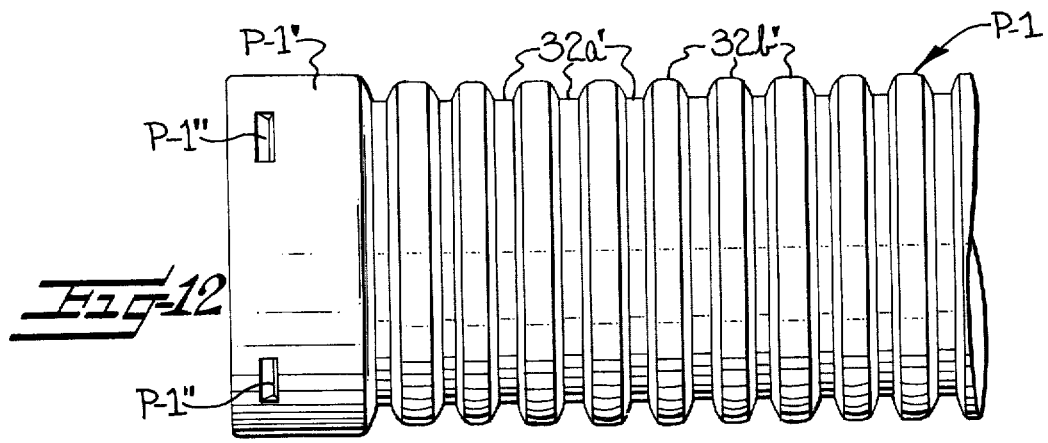
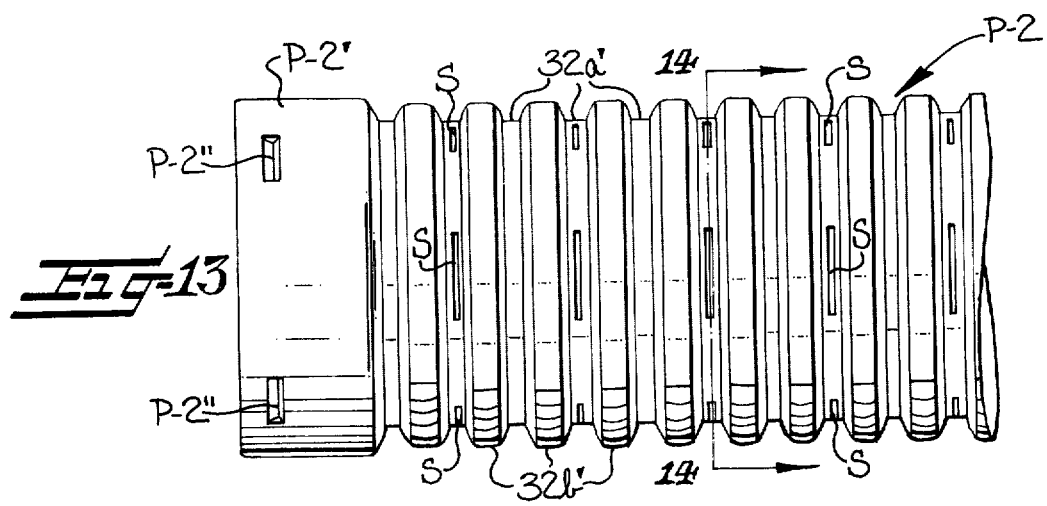
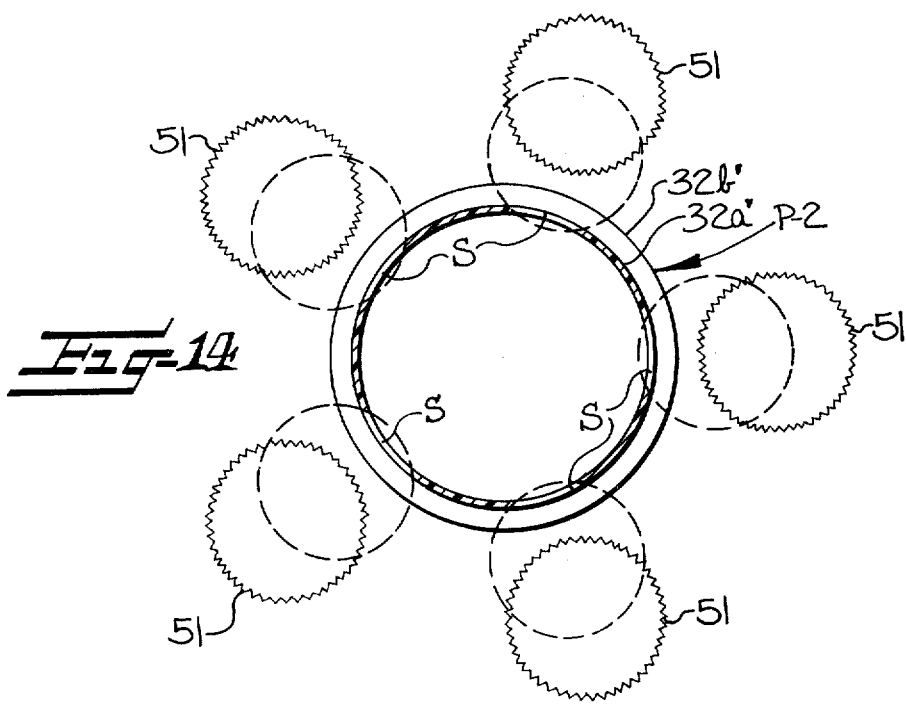

METHOD OF MAKING CORRUGATED PLASTIC PIPE WITH INTEGRAL COUPLER COLLARS

This invention relates to a novel method for making corrugated pipes, and more especially, to a method for making corrugated resilient plastic pipes having coupling means integrally formed on one end of the pipe for releasable interconnection with the opposite end of another like pipe.

Heretofore, it has been the practice to interconnect corrugated plastic pipes of the type which are used for septic tank fields, drainage pipes and irrigation pipes, by separate coupler elements or sleeves and, as far as can be determined, no one heretofore has provided a method for continuously producing a corrugated plastic pipe provided with coupler means integrally formed therewith which facilitates ready interconnection of pipes when installing the same in the field.

It is therefore the primary object of this invention to provide a novel method for making corrugated plastic pipes having coupler collars integrally formed therewith.

It is a more specific object of this invention to provide a method of continuously making corrugated plastic pipe of predetermined lengths having enlarged annular coupler collars on one end thereof, which method comprises continuously extruding a tube of plastic material into a molding zone while molding the tube into a series of successive closely spaced body-forming lengths of annularly corrugated pipe with integral relatively enlarged annular sleeves between and interconnecting adjacent body-forming lengths, and wherein the inner diameter of each sleeve is greater than the outer diameter of the body-forming lengths, severing the thus molded tube along a line about halfway between opposite ends of each successive sleeve to form each sleeve into a pair of separate collars, and also severing each successive body-forming length along a line about halfway between opposite ends thereof.

It is still another object of this invention to provide a method for continuously making corrugated plastic pipes having enlarged coupler collars on one end thereof, wherein an apparatus is used which includes an extruder for continuously extruding plastic material in the form of a tube into a molding zone comprising a plurality of cooperating pairs of forwardly moving semitubular die blocks. Each die block of certain of the cooperating pairs has a concave semicircular corrguated mold surface therein which cooperates with the mold surface of the other die block of the same pair so as to form an annular corrugated mold cavity in each of the certain pairs of die blocks. At least one other of the cooperating pairs of die blocks, and preferably two of the cooperating pairs of die blocks, has a relatively smooth, non-corrugated portion thereof defining a common sleeve-forming mold cavity therein of greater diameter than the corrugated mold cavities so that, as the extruded tube is expanded against the mold cavities, the tube is formed into a series of successive closely spaced corrugated lengths, with short interconnecting enlarged sleeves between the adjacent corrugated lengths. Also, tube severing means is spaced downstream of and cooperates with the molding zone for severing each successive sleeve along a line about halfway between its ends. Additionally, and as is preferred, the tube severing means also severs each corrugated length of the tube along a line about halfway between opposite ends of each such corrugated length to form standard-length pipes with enlarged coupler collars on one end thereof.

Some of the objects of the invention having been stated, other objects will appear as the description proceeds when taken in connection with the accompanying drawings, in which FIG. 1 is a block diagram of the method of making and processing plastic tubing to form corrugated plastic pipes in accordance with this invention;

FIG. 2 is a schematic perspective view of an arrangement of apparatus for carrying out the method of this invention;

FIG. 3 is a schematic plan view of the extruder and blow molding machine showing a preferred arrangement of the die blocks and showing a length of the molded plastic tube as produced during slightly more than one full cycle in the operation of the die blocks;

FIG. 4 is a schematic view showing a series of closely spaced body-forming lengths and interconnecting sleeves of the molded tube and showing lines along which it is preferred that the molded tube is severed to form nominal ten-foot pipes therefrom;

FIG. 5 is an enlarged fragmentary perspective view of the speed control or pipe tension sensing means shown in the central left-hand portion of FIG. 2;

FIG. 6 is an enlarged schematic and partially exploded perspective view of a drilling station representative of one embodiment of mechanism for forming openings or apertures in the molded tube emerging from the blow molding zone;

FIG. 7 is a schematic, partially exploded, perspective view of a slitting station representing a second embodiment of mechanism for forming openings or apertures in the molded tube, the drilling and slitting stations of FIGS. 6 and 7 being utilized alternatively in the processing of the tube as indicated in FIG. 1;

FIG. 8 is a vertical sectional view taken along line 8—8 in FIG. 2 and illustrating a control switch for actuating the normally inactive tube cutting machine in response to engagement of the switch by the leading end of the tube;

FIG. 12 is an elevation of one end portion of another embodiment of the pipe, but which is devoid of any interrupted ribs in the annular corrugations thereof;

FIG. 13 is an elevation of another embodiment of the pipe similar to that shown in FIG. 12, but wherein the pipe is provided with relatively small incisions or slits in alternately spaced valleys of the corrugations thereof; and FIG. 14 is a schematic view showing the relationship between the molded tube and the rotary cutting blades of the slitting station shown in FIG. 7.

Figure 9:
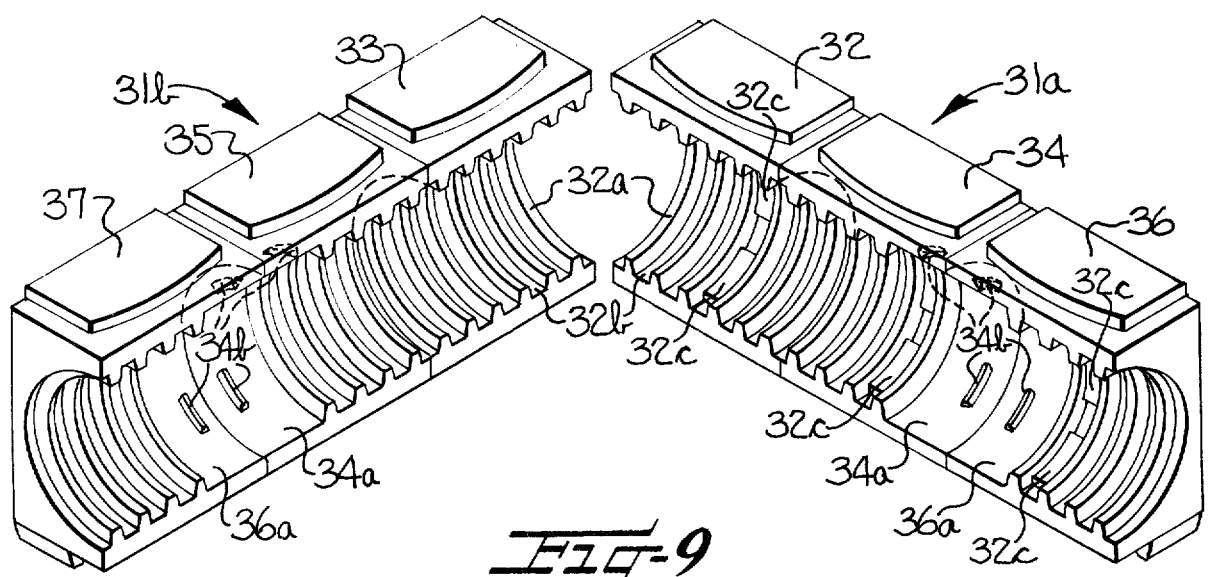
FIG. 9 is a perspective view of portions of the two series of die blocks shown in FIG. 3 with the die blocks in the two series being shown in exploded relationship to particularly illustrate those cooperating pairs of die blocks which form the enlarged interconnecting sleeves between adjacent corrugated body-forming lengths of the plastic tube being molded.

Referring more specifically to the drawings, especially FIG. 2, an extruding machine 20 is arranged to continuously extrude and feed a tube of hot plastic material to a blow molding machine broadly designated at 30. The blow molding machine is of a well known type which successively forms annular corrugations on the tube being extruded from the extruding machine 20, as the tube is received in an elongate blow molding zone, broadly designated at 31, formed by a plurality of pairs of cooperating substantially semitubular mold sections or die blocks arranged in end-to-end relation in each of two opposing series 31a, 31b. Conventional drive means, shown schematically at 31c in FIG. 3, is provided for moving the two series of die blocks along respective endless paths with the proximal runs or reaches of such paths extending in a substantially straight path aligned with the nozzle of extruding machine 20 and forming the blow molding zone 31.

As is also well known, the die blocks in the two series 31a, 31b move forwardly together along the substantially straight molding zone 31 where they are formed into said cooperating pairs with each cooperating pair forming a single mold cavity and with the cavities of all the die blocks in the molding zone forming an elongate composite mold cavity, as will become more apparent later in this context when the description is given with respect to FIG. 9. As is conventional, the extruder is provided with suitable pressure means 20a (FIG. 2) for introducing compressed air or other fluid under pressure into the tube being extruded to expand and mold the tube against the wall of the composite mold cavity.

A majority of the single mold cavities defined by the cooperating pairs of semitubular die blocks in the series 31a, 31b have annular corrugated walls of alternating ribs and valleys therealong as will be later explained. However, at least one remaining cooperating pair of the die blocks, and preferably two of the remaining cooperating pairs of die blocks, has a portion thereof including a noncorrugated relatively smooth substantially circular wall defining a mold cavity therein which is of substantially greater axial length than that of a plurality of the ribs in the aforementioned majority of the cooperating pairs of die blocks, with the cylindrical wall being of a diameter substantially greater than that of the valleys of the corrugations in the majority of the cooperating pairs of die blocks.

The reason for arranging the series of die blocks 31a, 31b in this manner is so that a single tube pattern is molded with each complete cycle in the movement of the series of die blocks 31a, 31b. In this regard, it is common practice for at least one manufacturer to construct each die block with a length of about 4.17 inches and, since the industry which installs corrugated plastic pipes for septic tank fields, irrigation purposes and the drainage of foundations or buildings, for example, usually desires that individual lengths of pipe be available in ten-foot lengths, it is preferred, in accordance with this invention, that each of the series of die blocks 31a, 31b in FIG. 3 includes 59 die blocks; i.e., it is preferred that the molding machine 30 is equipped with 59 cooperating pairs of die blocks, with 57 of the die blocks being provided with corrugated walls in the cavities thereof, and with the remaining two cooperating pairs of die blocks having proximal portions thereof formed with a non-corrugated form with substantially circular walls defining mold cavities therein as in FIG. 9.

Thus, when the molded tube T (FIGS. 2, 3, 4 and 10) emerges from molding zone 31, it will comprise successive closely spaced elongate corrugated lengths T-1 with enlarged relatively short non-corrugated sleeves T-2 between and interconnecting the proximal ends of adjacent corrugated lengths, and the distance between the median longitudinal centers of the adjacent sleeves will be about 20½ feet which, as preferred, somewhat exceeds the length of tubing required in order to form nominal ten-foot lengths of pipe therefrom having an integral enlarged coupler collar on one end thereof. It is desirable that the pipes are formed somewhat oversize, insofar as the length thereof is concerned, so as to insure that subsequent possible shrinkage of the plastic tube will not result in the customer receiving pipes which are below the desired minimum or nominal lengths.

As is well known, the moving die blocks in the molding zone 31 deliver the molded tube T forwardly at a predetermined speed. As indicated in FIG. 1, the thus molded tube T being delivered from blow molding machine 20 may be directed through a drilling machine or station 40, or a slitting machine or station 50, and then to a cutting machine or station 60. Also, a speed control or pipe tension sensing device 70 is provided between the molding machine and the drilling station or slitting station, as the case may be, for controlling the rate of feed of the tube through the drilling station 40 or the slitting station 50. The drilling and slitting stations 40, 50 are shown more in detail in the respective FIGs. 6 and 7 and are representative of means for forming apertures or openings in the wall of and along the length of each successive corrugated body-forming length of the tube T in its course to the cutting station 60. It is apparent that, when the drilling staton 40 is being used, the slitting station 50 is not utilized and vice versa. For purposes of description, only the drilling station 40 is shown in FIG. 2.

In some instances, as indicated in FIG. 1, it may be desirable to pass the tube T directly from the speed control 70 to the cutting station 60 without either drilling or slitting the tube T in its course from the blow molding machine 30 to the cutting station 60. In any event, the cutting station 60 may be actuated under the control of a sensing switch 80 which is spaced a predetermined distance downstream from cutting station 60 and is responsive to engagement thereof by the leading end of the molded tube T to actuate cutting station 60 to transversely sever or cut each successive sleeve T-2 intermediate its ends and preferably along a line C-2 halfway between its ends (FIGS. 4 and 10) so as to form each sleeve into a pair of separate collars integral with and projecting axially from the proximal ends of adjacent corrugated lengths of the tube, as will be later described. In the preferred embodiment, the switch 80 is positioned about ten feet and three inches forwardly of the rotary cutting blade or motorized saw 61 of the cutting station 60 so as to also transversely sever or cut each successive corrugated length T-1 along a line C-1 (FIG. 4) about halfway between the opposite ends of each successive corrugated body-forming length T-1 of the molded tube T to thus complete formation of successive corrugated pipes which are about ten feet and three inches long, and each of which has an integral enlarged coupler collar on one end thereof adapted to receive therein an opposite end portion of another like pipe.

Referring again to the blow molding machine 30, a few of the cooperating pairs of die blocks in the series 31a, 31b are shown in FIG. 9, and wherein it will be observed that only one of the cooperating pairs of die blocks, which represents the majority of cooperating pairs in FIG. 3, is shown in FIG. 9 with the two die blocks of the entirely corrugated pair being indicated at 32 and 33 in the respective endless series 31a, 31b. It will be noted that each of the majority of the cooperating pairs of die blocks, represented by the die blocks 32, 33 in FIG. 9 are corrugated throughout the axial length thereof. In other words, each of the semitubular die blocks 32, 33, which may be termed as a primary or corrugated die block, is provided with a semicircular mold cavity whose wall is defined by alternating semicircular ribs and valleys 32a, 32b so that when the proximal edges of the primary cooperating pairs of die blocks 32, 33 are in abutting relationship, as is the case when proceeding along the blow molding zone 31, each of the primary cooperating pairs of die blocks 32, 33 forms a single mold cavity having annular corrugated walls of alternating ribs and valleys. In this particular instance, each primary die block 32 in the series 31a has a plurality of circularly spaced, relatively short, arcuate inserts 32c in one of the valleys 32b thereof, with the thickness of each insert 32c being less than the height of the adjacent ribs 32a of the die blocks 32.

As heretofore stated, the axial length of each die block in each series 31a, 31b may be 4.17 inches, and it will be observed in FIG. 9 that each primary die block 32, 33 is provided with six semicircular ribs with a half of a valley on each end and five valleys between the ribs 32a.

Now, the two remaining or secondary pairs of cooperating die blocks 34, 35 and 36, 37 also are provided with alternating ribs 32a and valleys 32b in the distal portions thereof, but two of the ribs are omitted in the proximal portions of each of the secondary pairs of die blocks 34, 35; 36, 37 so that each of the die blocks of each secondary cooperating pair 34, 35; 36, 37 has a portion thereof including a non-corrugated, relatively smooth, substantially semicircular wall defining a semicircular mold cavity therein. Thus, when the mating faces of the secondary cooperating pairs of die blocks 34, 35; 36, 37 are in abutting relationship, as is the case during forward movement thereof along the molding zone 31 (FIG. 2), the proximal portions of the two secondary cooperating pairs of die blocks 34, 35 and 36, 37 are provided with non-corrugated, relatively smooth, substantially circular walls 34a, 36a, respectively, which collectively define a single sleeve-molding cavity. Each of the semicircular non-corrugated and relatively smooth mold wall surfaces 34a, 36a in FIG. 9 is provided with a pair of arcuately spaced inwardly extending and relatively small projections 34b thereon for forming a corresponding pair of sets of spaced latch members in each of the sleeves to be molded against the surfaces 34a, 36a, which latch members will be positioned on opposite sides of the median longitudinal center of the sleeve as will be later described (see FIG. 10).

Although it is preferred that two adjacent cooperating pairs of die blocks are shaped with cooperating surfaces to form a common sleeve-molding cavity as heretofore described, it is to be understood that, since the total length of the sleeve-molding cavity need not exceed the usual length of each die block, the sleeve-molding cavity may be formed in a single cooperating pair of die blocks without departing from the invention. Since each of the semicircular surfaces 34a, 36a is of an axial length less than about one-half of the length of the corresponding die blocks as shown in FIG. 9, and since the inserts 32c preferably are disposed in the centermost valley 32b of each die block, it will be noted that the two right-hand secondary die blocks 34, 36 in FIG. 9 are also provided with a plurality of the inserts 32c in the valleys 32b adjacent the longitudinal median centers of the two secondary die blocks 34, 36. Of course, it has already been stated that the distal portions of the two secondary cooperating pairs of die blocks 34, 35; 36, 37 are provided with alternating ribs and valleys 32a, 32b as is the case with respect to all of the primary pairs of cooperating die blocks 32, 33.

Figure 10:
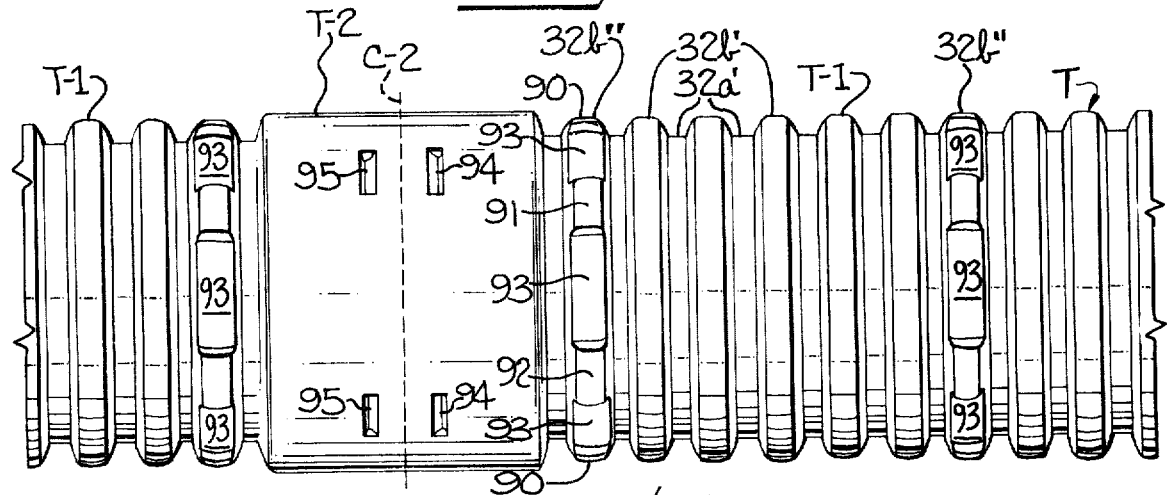
FIG. 10 is an enlarged elevation of a portion of the tube as molded utilizing die blocks of the type shown in FIG. 9, but before severing a sleeve between adjacent corrugated lengths.
Figure 11:
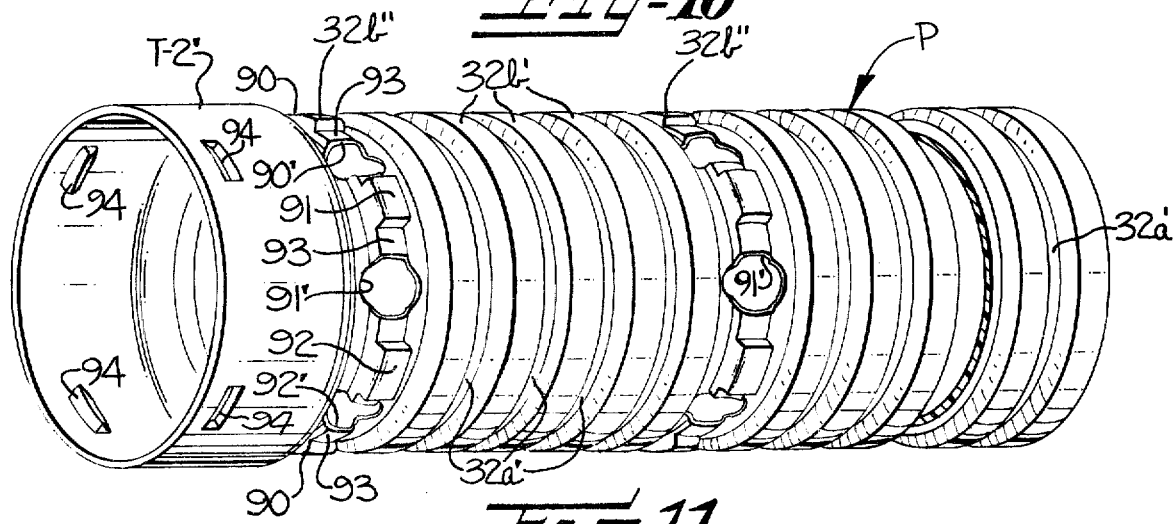
FIG. 11 is a view of one type of pipe produced in accordance with this invention by drilling holes in interrupted ribs of one of the corrugated body-forming lengths of the tube.

Utilizing die blocks formed as in FIG. 9 with three inserts 32c in each die block in the two series 31a, 31b of FIG. 3, the molded tube T takes the form shown in FIG. 10 to result in the form of pipe indicated at P and shown in FIG. 11, and which is fully disclosed and claimed in my copending application Ser. No. 262,103, filed June 12, 1972, and entitled CORRUGATED DRAINAGE PIPE WITH PLATEAUS DEFINING RECESSES now U.S. Pat. No. 3,747,352.

Referring to FIG. 10, it will be observed that, as a result of extruding the tube of hot plastic material into the molding zone formed of the die blocks arranged as described with respect to FIG. 9, and as a result of introducing pressurized fluid into the tube and expanding the same against the walls of the composite mold cavity formed of the die blocks as described with respect to FIG. 9 passing through the molding zone 31 of FIG. 2, the ribs and valleys 32a, 32b of the die blocks shown in FIG. 9 form successively arranged respective valleys and ribs 32a', 32b' which define annular corrugations along the body-forming lengths of the pipe with the majority of the ribs 32b' being uninterrupted and successively arranged in spaced groups of five and with an interrupting rib 32b'' between adjacent groups. Such ribs and valleys extend throughout the length of each corrugated body-forming length T-1 of the tube T, and the inner diameter of the sleeve T-2, integral with and interconnecting the proximal ends of each adjacent pair of corrugated body-forming lengths T-1, is greater than the outer diameter of the corrugated body-forming lengths T-1 of the molded tube.

Referring now to the interrupted ribs 32b'' in FIG. 10, due to the fact that preferably three circularly arranged spaced segmental inserts 32c are provided in one of the valleys 32b of each die block, it will be noted that each interrupted rib comprises a set of three circularly arranged spaced apart arcuate rib segments 90, 91, 92 having recessed wall portions or plateaus 93 extending between and interconnecting adjacent arcuate rib segments 90, 91, 92. The recessed wall portions or plateaus 93 are of a width corresponding to the medial portion of adjacent arcuate rib segments. Thus, the recessed wall portions 93 may be characterized as plateaus, since they are positioned outwardly from the walls of the valleys 32a' at a level intermediate the peripheries of the valleys and the peripheries of the ribs 32b'.

Depending upon the end use for which the tube is being processed, the tube T may be cut into the desired lengths of pipe P at the cutting station 60, as heretofore described with respect to FIGS. 1–4, without forming openings in the wall of the tube T, or the tube T may be provided with openings through the wall thereof before cutting the same into pipe lengths. By way of example, it will be observed in FIG. 11 that the pipe P is provided with a series of three drainage holes 90', 91', 92' which are disposed between the arcuate rib segments 90, 91, 92 of each interrupted rib 32b'' and extend through the corresponding recessed wall portions 93. Preferably, the arcuate segments or inserts 32c (FIG. 9) are similarly arranged in each of the die blocks 32, 34, 36 in the first series 31a so that the arcuate segments 90, 91, 92 in the interrupted ribs 32b'' are uniformly spaced from each other throughout the extent of each corrugated body-forming length of the tube T and so as to readily accommodate similar sized drainage holes between the arcuate segments, which drainage holes are of at least one-half inch diameter and preferably three-fourths inch diameter. It is preferred that the segment 90 of each interrupted rib 32b'' is of an arcuate extent exceeding 180° with the shorter rib segments 91, 92 each having an arcuate extent of about 20°–25° as described more in detail in said copending application.

It will be noted that, as each successive sleeve T-2 is molded by being expanded against the non-corrugated relatively smooth substantially annular or circular wall formed collectively by the surfaces 34a, 36a of the secondary cooperating pairs of die blocks 34, 35; 36, 37, the inwardly extending projections 34b on the arcuate wall surfaces 34a, 36a form two sets of inwardly extending latch members 94, 95 which are preferably uniformly spaced apart and circularly arranged in spaced relation to opposite sides of the median longitudinal center of the corresponding sleeve T-2, there preferably being four of the latch members in each of the sets 94, 95. corrugated pipes having integral coupler collars on one end thereof, and which collars are provided with latch members corresponding to the latch members 94, 95 are disclosed in my copending application Ser. No. 254,934, filed May 9, 1972, and entitled CORRUGATED PLASTIC PIPE WITH INTEGRALLY FORMED COUPLER. Accordingly, a more detailed description of the sets of latch members 94, 95 is deemed unnecessary. It should be noted, however, that it is preferred that the coupler collars T-2' (FIG. 11), formed by transversely severing each successive molded sleeve T-2 along a line halfway between opposite ends thereof, are each of such length as to receive therein three ribs of an interconnecting pipe with two of the ribs being positioned between the corresponding set of latch members 94 or 95 and the innermost longitudinal extent of the collar as defined by its juncture with the corresponding corrugated body-forming length of the pipe P. By this arrangement, it can be appreciated that two ribs are then positioned behind the latch members so that, in the event, that the first rib engaging the latch member is inadvertently moved outwardly beyond the latch members, there is another rib insuring an interconnection of the pipes. Of course, latch members 94, 95 are of such size and shape as to fit in the valleys of the corrugations of a cut-off end of any corrugated length T-1 of tube T.

Referring now to FIG. 6, there is shown schematically an embodiment of drilling station 40 which comprises a bank of three rotating drills 41, each of which is mounted so that it has a parallelogram type of movement; i.e., each of the drills is moved from an initial inactive position spaced from the periphery of the tube T into drilling engagement with the tube, then moved in the direction of the moving tube, and then withdrawn from the tube and returned to the inactive starting position. This movement of the respective drills 41 assures the forming of round drainage holes 90', 91', 92' in the tube T and the pipes being formed therefrom, as best illustrated in FIG. 11, with the drilled holes preferably being located in the interrupted ribs 32b'' as shown and being of a diameter greater than the width of the corresponding ribs 32b'' but less than the collective width of a rib and two valleys. The holes are drilled in series arcuately arranged around the tube at the predetermined locations along the length of the tube exemplified by the interrupted ribs 32b'' (FIG. 11). As representative of means for operating the drills 41 in the manner last described, it will be observed in FIG. 6 that all of the drills 41 are carried by a common carriage 42 which supports the drills in the desired radial relation to the tube T, and which carriage 42 is provided with an electric motor 43. Electric motor 43 is drivingly connected to the drills 41 through suitable belt and pulley connections. Carriage 42 is guided for movement parallel to the path of movement of tube T on a pair of parallel bars 45.

Additionally, each drill 41 is rotatably mounted on one end of a piston rod 46 which extends outwardly through carriage 42 and has a suitable piston thereon mounted for longitudinal sliding movement in the corresponding cylinder 41a. All of the cylinders 41a are of the double-acting type and are connected to a suitable source of fluid pressure, not shown, through a suitable electrical control and air valve system shown schematically at 41b in the left-hand upper portion of FIG. 6. The electrical controls for the valves which control the flow of fluid pressure to 41a *cylinders 41* are triggered by a suitable switch 41c interposed in an electrical circuit to the control system 41b. The switch 41c is normally open and is closed at predetermined intervals in accordance with the linear speed of the tube T and the spacing of the interrupted ribs 32b'' (FIG. 10) thereon by means of a suitable freely rotatable timing wheel 41d which is shown in the form of a gear meshing with the ribs of the tube T and normally resting upon the tube T.

Timing wheel 41d is mounted on a freely vertically movable shaft 41e having four control cams or projections 41f thereon which are provided for successively actuating drill swtich 41c. Thus, upon rotation of timing wheel 41d by the ribs of tube T, and upon six of the ribs 32b moving past wheel 41d, one of the cams 41f will operate drill switch 41c to, in turn, actuate the drills 41 through the electrical control system 41b. The electrical control system 41b may be of any well known type which will cause fluid pressure to enter the outer ends of the cylinders 41a, as well as the outer end of a carriage shifting cylinder 41g. The cylinder 41g is also of the double-acting type and has a piston and a piston rod associated therewith, the piston rod 41h of which is connected to carriage 42 for propelling the same forwardly and rearwardly.

Thus, as fluid pressure is introduced into the outer ends of cylinders 41a, 41g, it is apparent that the drills 41 move inwardly and engage the tube T in alignment with a corresponding interrupted rib 32b'' (FIG. 10) as carriage 42 is caused to move forwardly by piston 41h at the same speed as and in timed relation with the forward movement of tube T. After the drills 41 have penetrated through and properly formed the corresponding drilled drainage holes 90', 91', 92' (FIG. 11) in tube T, it is apparent that the flow of the fluid pressure is reversed in the cylinders 41a so that the drills 41 are withdrawn from the tube T and, thereafter, the flow of fluid in the cylinder 41g is reversed so that the carriage 42 is returned to its original position of rest.

Means are provided for positively feeding the molded tube T through the drilling station 40 and, although the positive feeding means may be considered as a part of the drilling station 40, it is broadly designated at 100 in FIG. 6 and is controlled by the speed control 70. It will be noted that the positive tube feed 100 in FIG. 6 is shown in the form of two pairs or sets of spaced feed gears, namely, a primary or first pair of laterally spaced feed gears 101 and a secondary or second pair of laterally spaced feed gears 102 which are spaced forwardly from the feed gears 101 at least to a sufficient extent to accommodate one of the sleeves T-2 (FIGS 2, 3, 4, 6 and 10) of the molded tube T in spaced relation between the two sets of feed gears 101, 102. The feed gears of each pair 101, 102 are diametrically opposed relative to the tube T and meshingly engage the ribs along opposite sides of the tube T. The feed gears 101, 102 are fixed on the upper portions of respective substantially upright shafts 101a, 102a which are connected, by universal joints 101b, to the output of a gear box 103. The input of gear box 103 is driven by an electric motor 104, preferably of the DC type, for imparting rotation to the tube feed gears 101, 102.

In order that the feed gears 101, 102 will not mutilate or otherwise damage the sleeves T-2 as they pass thereby, while still insuring that the tube T is fed forwardly continuously by one or the other of the cooperating pairs of feed gears 101, 102, means are provided for at least momentarily moving each set of gears 101, 102 out of the path of travel of each successive sleeve T-2. However, whenever either of the pairs of feed gears 101, 102 is out of engagement with the tube T, the other pair of feed gears is maintained in meshing engagement with the corrugations of the tube T. To this end, double-acting fluid pressure operated rams 101c, 102c have their cylinders suitably secured on the gear box 103 between the respective pairs of shafts 101a, 102a and a pair of piston rods extending from each of the two rams 101c, 102c is connected to the corresponding pair of shafts 101a, 102a. To this end, the shafts 101a, 102a have respective bearings 101d, 102d mounted thereon for connecting the distal ends of the piston rods thereto which extend from the respective rams 101c, 102c.

Fluid pressure lines 103a, 103b connect the rams 101c, 102c to a suitable fluid pressure control valve 103c which is connected to a suitable source of fluid pressure 103d and is controlled by a suitable timing device or electrical timer 103e. The timer 103e is triggered by a normally inactive switch 104f suitably mounted above the tube T and rearwardly of the two pairs of feed gears 101, 102. A suitable detector wheel 104g normally rides upon the molded tube T and, since each sleeve T-2 is of substantially greater external diameter than that of the corrugated body-forming lengths T-1 of the tube T, as each successive sleeve T-2 approaches the rearmost pair of feed gears 101, it moves the follower wheel 104g upwardly to actuate the switch 104f and to, in turn, actuate the electrical timer 103e. Electrical timer 103e may be of any well known type which will cause a delayed action of the control valve 103c so that, at about the time that the corresponding sleeve T-2 starts to move into the plane between the first pair of feed gears 101, fluid pressure will be introduced into the central portion of the ram 101c, causing the first pair of feed gears 101 to move outwardly apart from each other and out of the path of movement of the corresponding sleeve T-2 therebetween.

At about the same time that the first pair of gears 101 is moved outwardly to inactive position with respect to the tube T, the cylinder of ram 102c has fluid pressure introduced to opposite ends thereof to move the second pair of feed gears 102 from inactive positions into driving or feeding engagement with opposite side portions of the tube T. In so doing, the second pair of feed gears 102 will continue to advance the tube T forwardly while the first pair of feed gears 101 is inactive. conversely, after the corresponding sleeve T-2 has passed between and forwardly of the first pair of feed gears, and before it moves into engagement with the second pair of feed gears 102, the electrical timer 103e functions to reverse the flow of fluid pressure in the rams 101c, 102c to, in turn, move the first feed gears 101 into operative position at about the same time as the second pair of feed gears 102 are moved to the inoperative position. It is thus seen that the first and second pairs of feed gears 101, 102 alternate in feeding the tube T forwardly, thus insuring that there is no laspe in the feeding of the tube T through the drilling station 40 even though each successive sleeve T-2 moves between the respective pairs of feed gears 101, 102 without being engaged thereby.

In view of the tube T normally being in heated condition and not entirely cool at the instant any given portion thereof is passing through the drilling station 40, it is desirable to avoid stretching the tube T lengthwise as well as to avoid compressive shortening of the tube. To avoid these conditions, it is desirable to synchronize the speed of the two sets or pairs of feed gears 101, 102 with the delivery rate of the corrugated tube coming from the blow molding machine 30. This permits obtaining a final pipe product from the tube which has a substantially uniform number of ribs and valleys per unit of length thereof.

Referring now to the speed control tension device 70, as illustrated, it comprises a pulley 71 engaging tube T at a point between the molding machine 30 and the drilling station 40. Pulley 71 rests on tube T between a pair of spaced supporting rollers or members 70a, 70b (FIG. 2). Pulley 71 is mounted for free rotation on a shaft 72 (FIG. 5) which, in turn, is carried by one end of a pivotally mounted counterbalance arm 73. Arm 73 has an adjustably mounted counterbalance weight 74 on the other end thereof. A potentiometer or rheostat 75 electrically connected to motor 104 (FIG. 6), is positioned below and operatively connected to counterbalance arm 73, as best shown in FIG. 5, so that potentiometer 75 is varied in accordance with the position of counterbalance arm 73; i.e., in the event the tension in the tube T increases, this results in lifting of pulley 71 to reduce the speed of motor 104 and decrease the speed of tube feed gears 101, 102. Conversely, if the tube T becomes unduly slack and the tension therein drops to a predetermined minimum to thus cause the pulley 71 to move to a relatively lowered position, potentiometer 75 will increase the speed of motor 104 and thus increase the rate of feed of the tube feed gears 101, 102.

Referring now to pipe or tube cutting station 60, the motorized saw 61 thereof is actuated under control of the sensing switch 80 positioned a predetermined distance downstream therefrom, as heretofore described. The sensing switch 80 has a switch sensing arm 81 (FIG. 8) which protrudes upwardly through a pipe or tube guide trough 82 into the path of travel of the leading end of the tube T. Upon the leading end of the tube engaging the switch sensing arm 81, switch 80 is closed to actuate the motorized saw 61. It follows, therefore, that saw 61 severs each successive sleeve T-2 and each body-forming length T-1 in response to predetermined linear movement of Tube T forwardly of the molding zone 31. As is conventional, the motorized saw 61 is mounted for forward movement with the tube during the operation and, upon the cutting being completed, the saw 61 is reciprocated upstream to its original location ready for the next cutting operation.

As heretofore described, there are instances in which it is desirable that the pipes delivered to the customer have plain body portions with the enlarged coupler collar or flange on one end thereof; i.e., there are instances in which it is not necessary to perforate or otherwise provide openings in the wall of the corrugated bodies of the pipes being formed. A portion of a pipe of this type is shown in FIG. 12, wherein it will be observed that the pipe is broadly designated at P-1 and the corrugated body thereof is provided with alternating ribs and valleys 32b', 32a' which may be identical to the correspondingly numbered ribs and valleys of the pipe P shown in FIG. 11, but none of the ribs are interrupted in the body of the pipe P-1 of FIG. 12. The coupler collar on one end of the pipe P-1 is indicated at P-1' and is provided with a circular series of inwardly projecting latch members P-1''. The collar P-1' and its latch members P-1'' may be identical to collar P-2' and its latch members 94 and, therefore, a more detailed description of the form of pipe shown in FIG. 12 is deemed unnecessary.

The form of pipe shown in FIG. 13 is broadly designated at P-2 and may be made simply by forming slits S through the walls of alternate valleys of the pipe P-1. Accordingly, the ribs and valleys of the pipe P-2 are also indicated at 32b' and 32a', respectively, and the coupler collar and its latch members are designated at P-2' and P-2'', respectively, in FIG. 13. In this instance, there are five substantially uniformly circularly spaced slits S about 1/16 inch wide in every other one of the valleys 32a' of pipe P-2. The slits S may be of about the same length as the distance between adjacent slits and are usually in the range of about ¾ inch to 2 inches long in pipes of about 4 to 7 inches diameter.

Now, in order to form the corrugated pipe P-1, which is characterized by having a plain corrugated body, it is apparent that the tube T passes directly from the speed control 70 through cutting station 60 and, accordingly, the positive tube feed 100 of FIG. 6 then may be used for feeding the tube to the cutting station 60 regardless of whether or not the drilling station is being utilized.

Referring now to FIG. 7, there is shown a slitting station 50 which, as heretofore stated, may be used in place of the drilling station 40 when slits are to be formed in the corrugated body-forming lengths T-1 of the tube, as in forming the type of corrugated plastic pipe P-2 shown in FIG. 13. As shown in FIG. 7, a circularly arranged series of five substantially equally angularly spaced pairs of slitting saws or rotary cutting blades is normally spaced from and arranged in surrounding relation to the forwardly moving molded tube T. The tube T may have previously been molded in exactly the same manner as that described earlier herein utilizing the die blocks 32–37 in the form illustrated in FIG. 9. On the other hand, if it is preferred that all of the ribs are of the uninterrupted type shown in FIG. 12 or 13 in the corrugated body-forming lengths of T-1 of the tube, the segmental inserts 32c of FIG. 9 may be omitted from all of the valleys 32b in the die blocks. It is preferred, therefore, that the segmental inserts 32c are adhesively secured in the corresponding valleys 32b, such as by means of a solder material having a relatively low melting point, so that the segmental inserts 32c may be removed from the die blocks 32, 34, 36, if desired.

In any event, regardless of whether the corrugated body-forming lengths T-1 of tube T are of the type shown in FIGS. 10 and 11 or the type shown in FIGS. 12 and 13, it is preferred that the slits S (FIGS. 13 and 14) are formed in the walls of alternate valleys 32a'. Thus, it is preferred that the rotary cutting blades or slitting saws are arranged in respective axially aligned pairs, one of the slitting saws of each pair being indicated at 51, and the other slitting saw of each pair being indicated at 51a. The center-to-center distance between the two blades of each pair 51, 51a is substantially the same as the distance between the centers of alternate valleys 32a' of the corrugated lengths of tube T so that, each time the five pairs of blades 51, 51a are moved into cutting relation with tube T as shown in broken lines in FIG. 14, each pair of blades 51, 51a will cut correspondingly slits S in the walls of two alternately spaced valleys 32a'.

Each cutting blade pair 51, 51a is fixed on a respective shaft 51b (FIG. 7) journaled in the inner portions of a pivoted housing 51c containing suitable gearing or belt and pulley connections, not shown, which connect the shaft 51 to a respective drive motor 52. The five motors 52 are mounted in one stationary wall 52a of the housing of the slitting station 50 so that the motors 52 occupy fixed positions spaced around the axis of the tube T moving through the slitting station 50. Each of the housings 51c is pivotally mounted on the casing of the respective motor 52, and means are provided for moving the inner portions of the housings 51c inwardly and outwardly at predetermined times according to the predetermined speed at which the tube T is delivered from the molding zone 31 of molding machine 30. By way of example, it will be observed in FIG. 7 that the piston rod of a fluid operated double-acting ram 51d is pivotally connected to each of the pivoted housings 51c and the cylinder portion of each ram 51d is suitably mounted on the aforementioned wall 52a of the slitting station 50. Opposite ends of the cylinders of all of the double-acting rams 51d are suitably connected to an electrical valve control system generally designated at 53 and which is actuated by a normally inactive slitting switch 53a. The slitting station 50 includes a freely rotatable timing wheel 53b which is carried by a substantially horizontally disposed shaft 53c and normally rests upon the corrugated tube T. Shaft 53c has a plurality of control cams or radial fingers on its outer portion for successively actuating the slitting switch 53a at predetermined intervals determined by rotation of the timing wheel 53b in meshing engagement with the ribs of tube T. The electrical control system 53 responds each time switch 53a is actuated by one of the control cams 53d so as to introduce fluid pressure into the outer ends of the cylinders of rams 51d upon every fourth valley moving past the axis of wheel 53b and thus past either of the slitting blades 51, 51a, and so that the slits S (FIGS. 13 and 14) are formed in every other valley 32a' in each successive corrugated body-forming length T-1 (FIGS. 2, 3 and 4) of the tube T.

It is apparent that, upon fluid pressure being introduced into the outer end portions of the cylinders of the rams 51d in FIG. 7, the inner ends of all of the housings 51c are pivoted inwardly to move the slitting saws 51, 51a inwardly a predetermined distance to form the slits S of the desired arcuate length in the walls of alternate valleys 32a'. Of course, as soon as the slits S have been formed, the electrical control system 53 reverses the flow of fluid pressure in the cylinders of the rams 51d to withdraw the slitting saws 51, 51a out of the path of travel of the tube T. In order to insure that the slitting saws 51, 51a are not moved into engagement with the successive sleeves T-2 of the tube T, the timing wheel 53b and shaft 53c are so arranged that they will be moved upwardly by each successive sleeve T-2 moving into engagement therewith. Upon such upward movement of timing wheel 53b, a normally inactive switch 53e is activated thereby to, in turn, activate a timer 53f. Timer 53f is operatively associated with the electrical control system 53 and is effective to render the electrical control system 53 inoperable in response to a corresponding cam 53d engaging the switch 53a at such time as the corresponding sleeve T-2 subsequently passes into the plane of the pairs of cutting blades 51, 51a. Thus, the cutting blades 51, 51a remain in withdrawn or inoperative position whenever any one of the sleeves T-2 is aligned with the pairs of cutting blades or slitting saws. 51, 51a.

The slitting station 50 also is provided with a positive feeding mechanism which is somewhat similar to the positive feeding mechanism 100 of FIG. 6, but which is effective to impart intermittent or stepwise forward movement to that portion of the tube T being advanced through the slitting station so that such portion of the tube is at a standstill whenever the pairs of slitting saws 51, 51a are in cutting relation to any of the valleys 32a' in the corrugated lengths of the tube T. Therefore, in order to avoid repetitive description, the positive feed mechanism of FIG. 7 is broadly designated at 110 and those parts thereof which are substantially the same as like parts shown in FIG. 6 will bear the same reference characters, where applicable.

As shown in FIG. 7, the positive feed mechanism 110 differs from the positive feed mechanism 100 of FIG. 6 in that, although the first and second pairs of feed gears 101, 102 rotate continuously, they are bodily moved rearwardly and forwardly in a reciprocatory but translational manner and in such timed relation to rotation thereof that, during the course of each rearward translational movement thereof, the feed gears 101, 102 simply rotate in engagement with the corrugations of the tube T without imparting forward motion to the tube. In other words, the linear rearward movement of the two pairs of gears 101, 102 is correlated to the rate of forward rotation of the gears 101, 102 so that the gears 101, 102 simply move rearwardly relative to the tube without imparting either forward or rearward motion thereto. Conversely, during each forward linear or translational movement of the two pairs of feed gears 101, 102 (depending upon which pair then happens to be in engagement with the tube) the corresponding pair of gears 101, 102 then not only imparts forward movement to the tube T, but imparts an accelerated rate of movement thereto which is equivalent to the sum of the rotational rate of movement of the corresponding pair of gears coupled with the rate of forward translational movement being imparted to the corresponding pair of feed gears.

To this end, it will be observed in FIG. 7 that the upper portions of the shafts 101a, 102a are mounted in respective slide bearings a, b which are suitably supported on respective transverse bars c, d so that the upper portions of the shafts 101a may be moved inwardly and outwardly in the bearings a relative to the bar 6 and so that the upper portions of the shafts 102a also may be moved inwardly and outwardly in the bearings b relative to the transverse bar c. The transverse bars c, d are fixed on the upper ends of forwardly biased spring steel bars e, f whose lower ends are suitably secured to gear box 103. A lateral output shaft 111 on gear box 103 is connected to a cam shaft 112 thereabove by suitable belt and pulley connections 113. Cam shaft 112 may be journaled in any suitable fixed part, not shown, of the housing of the slitting station 50 and has a pair of cams h fixed thereon which engage respective followers i mounted on opposite ends of the transverse bar c.

Suitable links m extend between and interconnect the respective rear and front leaf spring members e, f so that, each time the high surface portion of each cam h moves into engagement with the respective follower i, both the rear and front pairs of upright shafts 101a, 102a are moved rearwardly as the proximal portions of the pairs of feed gears 101, 102 continue to rotate forwardly. It is apparent that the particular pair of gears 101 or 102 which happens then to be in engagement with the tube T will then be moved rearwardly of the tube without imparting rotation thereto and, at this time, the tube is at a standstill and the five pairs of slitting saws 51, 51a are moved into and out of engagement with the tube T to effect the cutting of the slits S in the mannner heretofore described.

Thereupon, the low surface of each cam h moves into registration with the respective follower i and the leaf spring bars e, f then quickly pull the two pairs of feed gears 101, 102 forwardly to impart forward movement to the tube at an accelerated speed which compensates for the lost motion thereof relative to the delivery speed of the molded tube T being delivered by the molding machine 30 so that the mean forward speed imparted to the tube T by the sets of feed gears 101, 102 is substantially the same as the predetermined speed at which the tube T is being delivered by the molding machine 30.

It is apparent that the feed gears 101, 102 in FIG. 7 are moved inwardly and outwardly, in alternation, relative to the tube T, in the same manner as that heretofore described with respect to FIG. 6, so as to permit the successive sleeves T-2 to move past the feed gears 101, 102 of feed mechanism without being engaged thereby. Accordingly, a further more detailed description of the slitting station 50 and its related feed mechanism 110 is deemed unnecessary.

In each embodiment P, P-1, P-2 of the pipe, although the coupler collars T-2', P-1', P-1' are described as being circular as is preferred, it is to be understood that they may be polygonal or slightly oval-shaped, if desired, without departing from the invention, provided that the inner shape and size of the coupler collar is, in each instance, capable of circumscribing a diameter greater than the outer diameter of the ribs of a like pipe. In other words, the coupler collars must be capable of matingly receiving therein the opposite end of another like pipe.

In the drawings and specification, there have been set forth preferred embodiments of the invention and although specific terms are employed, they are used in a generic and descriptive sense only and not for purposes of limitation.

That which is claimed is:

1. A method of making plastic pipes each having an elongate tubular corrugated body and an integral enlarged coupler collar on one end of each body; said method comprising continuously extruding a tube of hot plastic material into a blow molding zone defined by a series of cooperating pairs of forwardly moving die blocks, while molding annular corrugations of alternating ribs and valleys along successive closely spaced, elongate portions of the tube to produce predetermined corrugated lengths of the tube during forward movement thereof through the molding zone, while also molding each of those portions of the tube between the corrugated lengths into an enlarged relatively short sleeve of an inner shape and size capable of circumscribing a circle of a diameter greater than the outer diameter of the ribs during forward movement of the tube through the molding zone, and while molding a plurality of spaced latch members integral with and projecting inwardly around the interior of each sleeve adjacent opposite sides of the median longitudinal center thereof and wherein the latch members are of such size and shape as to fit in at least one valley of a cut-end portion of the corrugated lengths, transversely severing said tube intermediate the ends of the respective sleeves to form each sleeve into a pair of separate collars integral with and projecting axially from the proximal ends of adjacent corrugated lengths so that some of said latch members are positioned within both of the separate collars formed by severing each sleeve, and transversely severing each of said corrugated lengths intermediate the ends thereof so that each pipe thus formed has a collar on one end only thereof adapted to receive therein the corrugated opposite end portion of anoter like pipe.

2. A method according to claim 1, in which the molding of said portions of the tube into sleeves includes molding each sleeve in circular cross section.

3. A method according to claim 1, wherein the step of severing the tube intermediate the ends of the sleeves includes severing each successive sleeve in response to predetermined linear movement of the molded tube forwardly of the molding zone.

4. A method according to claim 1, wherein each of said steps of severing the tube is effected in response to predetermined linear movement of the molded tube forwardly of the molding zone.

5. A method according to claim 1, wherein the step of severing the tube to form each sleeve into a pair of collars includes severing each successive sleeve as it reaches a predetermined cutting zone spaced downstream of the molding zone, and further comprising the step of forming a plurality of openings along each successive corrugated length of the tube in its course from the blow molding zone to the cutting zone.

6. A method according to claim 1, in which the step of severing said tube to form each sleeve into a pair of collars includes severing each successive sleeve as it reaches a predetermined cutting zone spaced downstream from the molding zone, and further comprising the step of successively slitting the tube transversely thereof through certain of the valleys therein in its course from the blow molding zone to the cutting zone to form a plurality of radial slits through the wall of the tube.

7. A method according to claim 1, wherein the step of severing the tube to form each sleeve into a pair of separate collars includes severing each successive sleeve as it reaches a predetermined cutting zone spaced downstream of the molding zone, and further comprising the step of feeding the molded tube from the molding zone through a drilling station by meshingly engaging the corrugations of the pipe with first and second longitudinally spaced sets of forwardly moving teeth with successive teeth of each set entering successive valleys and pushing forwardly against respective ribs of the successive corrugated lengths of the tube in their course from the blow molding zone to the cutting zone, alternatively withdrawing each respective first and second set of forwardly moving teeth out of the path of travel of each successive sleeve of the tube whenever a sleeve is to move past the corresponding set of teeth and while maintaining the other of the sets of teeth in meshing engagement with the corrugations of the tube to insure forward movement of the tube without the sets of teeth damaging the sleeves thereof, and drilling holes in the tube as it passes through the drilling station.

8. A method according to claim 7, including sensing variations in tension in the molded tube being fed, and in response thereto, varying the rate of movement of the forwardly moving teeth to compensatively vary the rate of feed of the tube to substantially accord with the rate at which the molded tube emerges from the blow molding zone.

9. A method according to claim 1, in which the molding of annular corrugations along elongate portions of the tube includes molding the majority of said ribs in uninterrupted annular form while molding each of certain spaced ribs in the form of an interrupted rib with recessed wall portion defining an interruption therein positioned at a level intermedite that of the peripheries of the ribs and valleys.

10. A method according to claim 9, in which the step of severing said tube to form each sleeve into a pair of separate collars includes severing each successive sleeve as it reaches a predetermined cutting zone spaced downstream of the molding zone, and further including the step of forming a drainage hole in each of the recessed wall portions of the tube in its course from the molding zone to the cutting zone.

11. A method according to claim 1, wherein the step of severing the tube to form each sleeve into a pair of separate collars includes severing each successive sleeve as it reaches a predetermined cutting zone spaced downstream of the molding zone, and further comprising the step of feeding the molded tube from the molding zone through a slitting station by meshingly engaging the corrugations of the tube with first and second longitudinally spaced sets of forwardly moving teeth with successive teeth of each set entering successive valleys and pushing forwardly against respective ribs of the successive corrugated lengths of the tube in their course from the blow molding zone to the cutting zone, alternatively withdrawing each respective first and second set of forwardly moving teeth out of the path of travel of each successive sleeve of the tube whenever a sleeve is to move past the corresponding set of teeth and while maintaining the other of the sets of teeth in meshing engagement with the corrugations of the tube to insure forward movement of the tube without the sets of teeth damaging the sleeves thereof, and forming slits through certain valleys of the tube as it passes through the slitting station.

12. A method according to claim 11, including sensing variations in tension in the method tube being fed, and in resonse thereto, varying the rate of movement of the forwardly moving teeth to compensatively vary the rate of feed of the tube through the slitting station to substantially accord with the rate at which the molded tube emerges from the blow molding zone.

13. A method of continuously making corrugated plastic pipes of predetermined length having enlarged annular coupler collars on one end thereof, said method comprising extruding a tube of plastic material into a molding zone, while successively molding the tube in its course through the molding zone into relatively short annular sleeves and integral relatively long annularly corrugated lengths arranged in alternation, with the inner diameter of the sleeves being greater than the outer diameter of the corrugated lengths, while also molding a plurality of spaced latching members integral with and projecting inwardly around the interior of each sleeve adjacent opposite sides of the median longitudinal center thereof with the size and shape of the latching members being such as to fit in the valleys of the corrugations in a cut-off end of said corrugated lengths of the tube, delivering the thus molded tube from the molding zone at a predetermined speed while directing the tube delivered from the molding zone through a cutting zone, transversely severing one of the sleeves along a line about at its median longitudinal center as it passes through the cutting zone to form a pair of separate collars therefrom, then transversely severing the next succeeding corrugated length of the tube along a line about halfway between the previously severed sleeve and the next succeeding sleeve as the corrugated length passes through the cutting zone, and repeating the said steps of severing in that order as succeeding sleeves and corrugated lengths pass through the cutting zone.

14. A method of making plastic pipes each having an elongate corrugated body and an integral enlarged coupler collar on one end of each body; said method comprising continuously extruding a tube of hot plastic material forwardly into a blow molding zone defined by a series of cooperating pairs of forwardly moving die blocks, while molding annular corrugations of alternating ribs and valleys along successive closely spaced and elongate portions of the tube to form corrugated bodyforming lengths of the tube during movement thereof through the molding zone, while also molding each portion of the tube between the bodyforming lengths into a relatively short sleeve of an inner diameter greater than the outer diameter of the ribs during forward movement of the tube through the molding zone, while molding a plurality of spaced latch members integral with and projecting inwardly around the interior of each sleeve and wherein the latch members are of such size and shape as to fit in at least one valley of a cut-end portion nof the corrugated lengths delivering the thus molded tube from the molding zone at a predetermined speed and feeding the tube forwardly through a cutting zone, transversely severing the tube in its course through the cutting zone in such relation to said sleeves as to form the same into annular collars projecting axially from at least one of the ends of the bodyforming lengths sof the tube and having inwardly projecting latch members integrally formed on the collars, and transversely severing each of said corrugated lengths intermediate the ends thereof so that each pipe thus formed has a collar on one end only thereof adapted to receive therein the corrugated opposite end portion of another like pipe.

15. A method according to claim 14, which includes directing the molded tube through a slitting station in the path of movement of the tube from the molding zone to the cutting zone, and slitting through the wall of the tube transversely thereof in certain of the valleys of the corrugations to form a plurality of circumferential slits therein.

16. A method according to claim 15, wherein the step of slitting includes repeatedly moving a plurality of rotary cutting blades radially into and then out of cutting engagement with the tube, and the directing of the tube through the slitting station includes momentarily stopping forward movement of the portion of the tube in the slitting station each time the cutting blades move into engagement with the tube, and advancing the portion of the tube in the slitting station at a compensatingly faster linear speed than the molding zone delivery speed each time the cutting blades move out of engagement with the tube so that the average speed of the tube through the slittting station is about the same as the speed at which the tube is being delivered from the molding zone.

17. A method according to claim 14, which includes directing the molded tube through a drilling station in the path of movement of the tube from the molding zone to the cutting zone, and drilling holes in the corrugated lengths of the tube as it passes through the drilling station while maintaining the speed of movement of the tube through the drilling station substantially the same as that at which the tube is delivered from the molding zone.

18. A method according to claim 17, which includes sensing a predetermined number of ribs on the tube, and in response thereto, drilling the holes in the tube at the drilling station.

19. A method according to claim 17, wherein the drilling of holes in the tube as it passes through the drilling station includes drilling a series of holes arcuately arranged around the tube at predetermined spaced locations along the length of the tube.

20. A method according to claim 19, wherein the drilling of the arcuately arranged series of holes includes moving a corresponding number of rotating drills to drilling engagement with and through the tube as it is being fed forwardly.

* * * * *

UNITED STATES PATENT OFFICE
CERTIFICATE OF CORRECTION

PATENT NO. : 3,891,733
DATED : June 24, 1975
INVENTOR(S) : Ernest J. Maroschak

It is certified that error appears in the above-identified patent and that said Letters Patent are hereby corrected as shown below:

In the Abstract, Line 1, after "method" delete "and apparatus".
Column 7, Line 41, "corrugated" should be --Corrugated--.
Column 8, Line 42, before "41a" insert --the cylinders--; same line, after "41a" delete "cylinders 41". Column 10, Line 26, "conversely" should be --Conversely--. Column 11, Line 25, after "the" and before "operation" insert --cutting--. Column 15, Line 9, "P-1" should be --P-2'--; same column, Line 62, "anoter" should be --another--. Column 17, CLAIM 12, Line 29, "method" should be --molded--; same column, Line 30, "resonse" should be --response--. Column 18, CLAIM 14, Line 21, "nof" should be --of--; same column, Line 29, "sof" should be --of--. Column 19, CLAIM 18, Line 3, delete the first occurrence of "the". Column 20, CLAIM 20, Line 5, "to" should be --into--.

Signed and Sealed this seventh Day of October 1975

[SEAL]

Attest:

RUTH C. MASON
Attesting Officer

C. MARSHALL DANN
Commissioner of Patents and Trademarks